(No Model.) 2 Sheets—Sheet 1.
E. G. LATTA.
VELOCIPEDE.
No. 377,900. Patented Feb. 14, 1888.
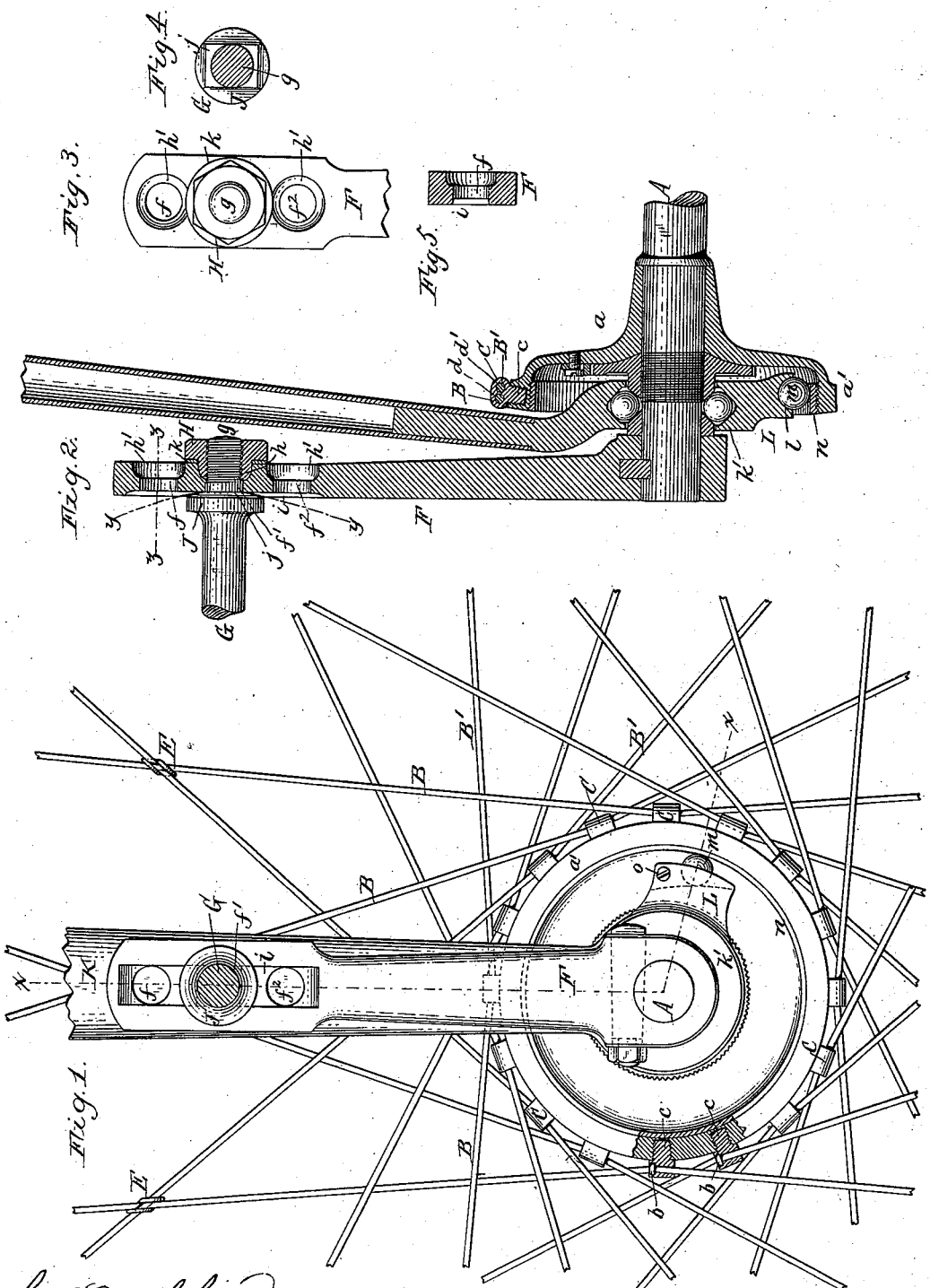
Witnesses: Chas. J. Buchheit, Geo. J. Buchheit Jr.
Emmit G. Latta, Inventor.
By Wilhelm Bonner,
Attorneys.
N. PETERS, Photo-Lithographer, Washington, D. C.

(No Model.) 2 Sheets—Sheet 2.

E. G. LATTA.
VELOCIPEDE.

No. 377,900. Patented Feb. 14, 1888.

Witnesses: Chas. J. Buchheit, Geo. J. Buchheit Jr.

Emmit G. Latta, Inventor.
By Wilhelm Bonner,
Attorneys.

UNITED STATES PATENT OFFICE.

EMMIT G. LATTA, OF FRIENDSHIP, NEW YORK, ASSIGNOR TO THE POPE MANUFACTURING COMPANY, OF PORTLAND, MAINE.

VELOCIPEDE.

SPECIFICATION forming part of Letters Patent No. 377,900, dated February 14, 1888.

Application filed January 27, 1887. Serial No. 225,671. (No model.)

*To all whom it may concern:*

Be it known that I, EMMIT G. LATTA, of Friendship, in the county of Allegany and State of New York, have invented new and useful Improvements in Velocipedes, of which the following is a specification.

The object of this invention is to produce a strong and durable wheel which can be easily repaired, to provide a device which prevents the fork from turning forwardly when the motion of the wheel is suddenly arrested, and to secure the pedal to the crank in a substantial manner, which permits the crank to be arranged closely to the wheel.

My invention consists of the improvements which will be hereinafter fully set forth, and pointed out in the claims.

Figure 6:
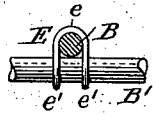
Figure 7:
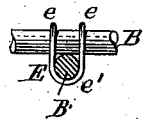
Figure 8:
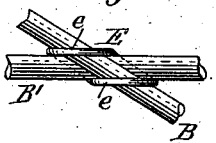
Figure 9:
Figure 10:
Figure 11:
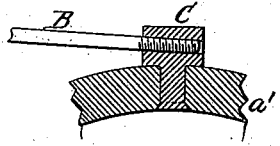
Figure 12:
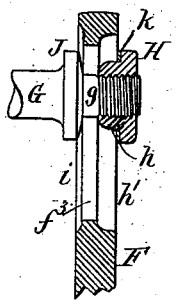
Figure 13:
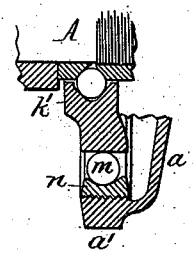
Figure 14:
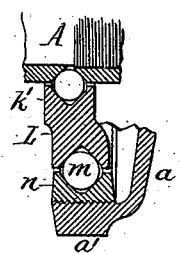
Figure 15:
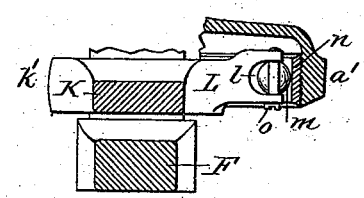

In the accompanying drawings, Figure 1 is a sectional side elevation of the central portion of the wheel and connecting parts. Fig. 2 is a vertical section in line $x$ $x$, Fig. 1. Fig. 3 is a rear elevation of the outer end of the crank. Fig. 4 is a cross-section of the pedal-shaft in line $y$ $y$, Fig. 2. Fig. 5 is a cross-section of the crank in line $z$ $z$, Fig. 2. Figs. 6 and 7 are elevations at right angles to each other of one of the loops applied to two crossing spokes. Fig. 8 is a top plan view thereof. Fig. 9 is a perspective view of the loop detached from the spokes. Fig. 10 is a plan view of the ring or blank of which the loop is stamped. Fig. 11 is a sectional view showing a slightly-modified construction of the eyebolts to which the inner ends of the spokes are secured. Fig. 12 is a sectional view of the outer end of the crank, showing a modified construction of the crank. Figs. 13 and 14 are sectional views showing slightly-different constructions of the friction-clutch. Fig. 15 is a sectional top plan view of the friction-clutch.

Like letters of reference refer to like parts in the several figures.

A represents the axle, and $a$ the hub-flange secured thereto.

B represents the spokes of the outer row, and B' the spokes of the inner row.

C represents eyebolts secured to the rim $a'$ of the hub-flange by means of screw-threaded shanks $c$, formed on the eyebolts and entering screw-threaded radial sockets formed on the outer side of the rim $a'$. Each eyebolt C is provided with two sockets, $d$ $d'$, arranged side by side, for the reception of the inner ends of an outer spoke, B, and an inner spoke, B'. The spokes are arranged tangentially, or nearly so, and the sockets $d$ $d'$ are arranged in the eyebolts in such position that each spoke will extend in a straight line through the socket in the eyebolt and to the rim of the wheel. As shown in Fig. 1, the inner ends of the spokes are provided with heads $b$, which are countersunk in the ends of the sockets $d$ $d'$. In this case the outer ends of the spokes are screwthreaded and secured to the rim (not shown in the drawings) in the usual manner. If preferred, however, the spokes may be headed at their outer ends and may be screwed into sockets of the eyebolts, as represented in Fig. 11. The eyebolts may be secured to the hub-flange by riveting, as indicated in the same figure.

E represents loops by which the spokes are secured together at their outer crossings. Each loop is provided with two bends, $e$ $e$, which embrace the outer spoke, B, and two bends, $e'$ $e'$, which embrace the inner spoke, B', the bends $e'$ $e'$ being arranged in a plane at an angle to the plane of the bends $e$, corresponding with the angle at which the two spokes cross each other. Each loop is preferably stamped out of a ring, E', which may be stamped out of sheet metal. The loops E are applied to the spokes by laying the loops over the inner spokes and passing the ends of the crossing outer spokes through the loops as the outer spokes are inserted. The inner spokes are preferably inserted first through the eyebolts, and may be secured to the rim of the wheel before the outer spokes are inserted. The loops E form a secure and smooth fastening for the crossing spokes, and as each loop is constructed of a continuous piece of metal no loose ends can project, as is sometimes the case when binding-wires are employed for securing the spokes together. The elasticity of the loops is sufficient to hold the two crossing spokes closely against each other; but, if desired, the spokes may be soldered together at the crossings. The loops may be applied to either of the crossings, but are most important at the outer crossings. This construction of the spokes permits any spoke to be adjusted as to tension without disturbing any other spoke or the binding-loops. The spokes are straight and therefore not liable to snap off; but should a spoke break, it can be replaced by a new spoke without disturbing any other spoke. When a spoke is removed, the binding-loop can be taken off without loosening the other spoke, and a new loop can be inserted upon removing one spoke.

F represents the crank secured to the axle in the usual manner and provided in its outer end with a series of openings, $f\ f'\ f^2$, in which the pedal-shaft G is secured by a screw-threaded shank, $g$, and a screw-nut, H. The crank F is provided in its outer face with a shallow straight-sided groove, $i$, which connects the openings $f\ f'\ f^2$. The pedal-shaft G is provided adjacent to the crank with a collar, J, and a flat-sided shank or shoulder, $j$, formed on the rear side of the collar J and entering the groove $i$, thereby preventing the pedal-shaft from turning in the crank. The screw-nut H is provided at its outer side with a round boss or extension, $h$, which enters a countersink or enlargement, $h'$, formed in the crank at the rear end of each of the openings $f\ f'\ f^2$. This construction affords a long bearing for the nut H on the screw-shank $g$, which prevents stripping the thread, and enables the rearwardly-projecting part of the nut to be made comparatively thin or flat without sacrificing strength. The crank can be arranged closely against the fork, and insures a close build.

$k$ represents a washer which may be interposed between the crank and the nut H around the extension $h$ of the same, for the purpose of preventing the nut from marring the rear side of the crank. When the crank is constructed with a slot, $f^3$, instead of the series of openings $f\ f'\ f^2$, the slot $f^3$ is enlarged on the rear side of the crank to receive the extension of the nut H, as represented in Fig. 12.

K represents one of the fork-arms, and $k'$ the bearing-box at the lower end thereof.

L represents a lug or short arm formed on the bearing-box $k'$ and extending rearwardly therefrom toward the inner face of the rim $a'$ of the hub-flange $a$.

$l$ is an eccentric groove formed in the rear side of the lug L and approaching the hub-flange downwardly, so as to form a downwardly-contracting space between the bottom of the groove $l$ and the rim of the hub-flange.

$m$ represents a ball or roller interposed between the groove $l$ and the rim of the hub-flange.

The groove $l$, rim $a'$, and ball or roller $m$ constitute a friction-clutch which permits the wheel to turn forwardly, but prevents the same from turning backwardly. This friction-clutch also prevents the fork from turning forwardly on the axle when the wheel strikes an obstruction and is retarded. In the last-named case, the fork tending to swing forwardly on the axle as a center, the eccentric groove $l$ wedges the ball $m$ against the rim $a'$, thereby locking the fork to the wheel and preventing the forward movement of the fork. When the wheel revolves normally, the friction of the rim $a'$ against the ball $m$ lifts the latter and prevents it from binding between the groove $l$ and the rim $a'$. Whenever the rotation of the wheel is suddenly retarded and the momentum of the rider tends to carry the upper end of the fork forwardly, the friction-clutch locks the fork to the wheel and prevents the kind of a fall known as a "header." In this manner falls are prevented upon striking obstructions at a moderate speed or descending elevations, and the rider is enabled to dismount if the obstruction is impassable. The clutch is also of great assistance to inexperienced riders in learning to mount and dismount by the pedals, as it prevents the wheel from turning backwardly and the forward falls resulting therefrom. The rim $a'$ is provided on its inner side with a ring or lining, $n$, of hardened steel, against which the ball or roller $m$ bears, and which is secured in the rim $a'$ of the hub-flange by a screw-thread or other suitable means. The ring $n$ has a straight inner face, so that the ball $m$ will find a bearing on the same in any of the positions to which the bearing $k'$ may be adjusted on the axle.

If desired, the arm L may be constructed with a straight eccentric face, and the ring $n$ with an annular groove in which the ball $m$ runs, as represented in Fig. 13. When the bearing is not adjustable lengthwise of the axle, both the arm L and the ring $n$ may be provided with grooves, as represented in Fig. 14. $o$ represents a small screw which is secured in the arm L across the open upper end of the groove $l$, and which retains the ball or roller $m$ in the same. Upon removing this screw the rider can remove the ball from the groove without removing the crank. The upper end of the groove $l$ may be made closed or be provided with a permanent stop which retains the ball in the groove; but this is less desirable. When the rings $n$ are secured by screw-threads to the hub-flanges, the threads on the two rings at opposite ends of the hub are cut in opposite directions, one right and the other left, so that the action of the clutch tends to tighten the rings.

I claim as my invention—

1. The combination, with two crossing spokes, of a binding-loop, E, provided with bends $e\ e$ and $e'\ e'$, arranged in different planes and embracing the spokes, substantially as set forth.

2. The combination, with the crank and the pedal-shaft G, provided with a screw-threaded shank, $g$, of a fastening-nut, H, having a round extension, $h$, adjacent to the crank, substantially as set forth.

3. The combination, with the crank provided with a series of openings, $f\ f'\ f^2$, extending through the crank, and a groove, $i$, connecting said openings and extending partly into the crank, of a pedal-shaft, G, provided with a shoulder, $j$, entering said groove, and with a screw-threaded shank, $g$, and a screw-nut, H, substantially as set forth.

4. The combination, with the crank provided with an opening, $f$, having an enlargement, $h'$, at its rear end, of a pedal-shaft, G, provided with a screw-threaded shank, $g$, and a screw-nut, H, provided with a round extension, $h$, entering the enlargement $h'$ of said opening, substantially as set forth.

5. The combination, with the hub having an annular flange, of a fork provided with an arm, L, having an eccentric groove, $l$, and a ball, $m$, arranged in said groove and within the hub-flange, substantially as set forth.

6. The combination, with the hub having an annular flange, of a fork provided with an arm, L, having an eccentric groove, $l$, a ball, $m$, arranged in said groove, and a removable stop, $o$, secured across the open end of the groove $l$, substantially as set forth.

Witness my hand this 17th day of January, 1887.

EMMIT G. LATTA.

Witnesses:
 CHAS. J. RICE,
 FRED H. RICE.